United States Patent [19]

Zimmer et al.

[11] Patent Number: 5,431,057
[45] Date of Patent: Jul. 11, 1995

[54] INTEGRATABLE CAPACITATIVE PRESSURE SENSOR

[75] Inventors: Günther Zimmer; Jörg Eichholz, both of Duisburg; Wilfried Mokwa, Krefeld; Michael Kandler, Erestadt; Yiannakis Manoli, Mülheim, all of Germany

[73] Assignee: Fraunhofer-Gesellschaft zur Forderung der Angewandten Forschung e.V., Munich, Germany

[21] Appl. No.: 198,489

[22] Filed: Feb. 18, 1994

Related U.S. Application Data

[62] Division of Ser. No. 917,007, filed as PCT/DE91/CO107, Feb. 9, 1991.

[30] Foreign Application Priority Data

Feb. 12, 1990 [DE] Germany ............... 40 04 179.4

[51] Int. Cl.⁶ .............................................. G01L 9/12
[52] U.S. Cl. ................................. 73/724; 29/25.42
[58] Field of Search .............. 73/718, 724; 29/25.41, 29/25.42; 361/283

[56] References Cited

U.S. PATENT DOCUMENTS

| 4,432,007 | 2/1984 | Cady | 73/724 |
| 4,467,394 | 8/1984 | Grantham et al. | 73/718 |
| 4,773,972 | 9/1988 | Mikkor | 73/724 |
| 4,838,088 | 6/1989 | Murakami | 73/724 |
| 5,189,916 | 3/1993 | Mizumoto et al. | 73/718 |

FOREIGN PATENT DOCUMENTS

| 0230084 | 7/1987 | European Pat. Off. | G01L 9/12 |
| 3404262 | 3/1984 | Germany | G01L 9/12 |
| 3723561 | 7/1987 | Germany | G01L 9/12 |

OTHER PUBLICATIONS

H. Guckel & D. W. Burns "Planar Processed Polysilicon Cavities for Pressure Transducer Arrays" pp. 223-225, 1984.
H. Guckel & D. W. Burns "A Technology for Integrated Transducers" pp. 90-92, 1985.
M. M. Farooqui & A. G. R. Evans "A Polysilicon-Diaphragm-Based Pressor Sensor Technology" pp. 1469-1471, 1987.
Howe, Roger T. "Surface Micromachining for Microsensors and Microactuators", pp. 1809-1813, 1988.
Wise, K. D. "The Role of Thin Films in Integrated Solid-State Sensors" pp. 617-622, 1986.
W. Minkina & W. Soltysiak "Method Der Dynamischen Sustande Zur Kapazitatsmessus Eines Mikrorechners" pp. 48-53, 1989. No Translation.
Krauss, M. & Herold, H. "Architekturen Kapazitiver Sensoren Mit Schutzschirmetechnik Und Zugehorige Sensorelektronik" pp. 56-59, 1989. No Translation.

Primary Examiner—Richard E. Chilcot, Jr.
Assistant Examiner—William L. Oen
Attorney, Agent, or Firm—Ralph H. Dougherty

[57] ABSTRACT

A process for manufacturing an integratable capacitative pressure sensor includes the following steps, starting from a semiconductor substrate (1): application of a guard film (2), precipitation of a polycrystalline semiconductor film (4), doping the polycrystalline semiconductor film (4) and removal of the guard film (2) by etching; then insulating the semiconductor zone (7) from the semiconductor substrate (1), and applying an insulator film (8) on the insulated semiconductor zone (7). The pressure sensor product, which is compatible with CMOS circuits and has increased sensor accuracy, includes a semiconductor zone (7) insulated from the semiconductor substrate (1) and an insulator film (8) applied on the insulated semiconductor zone (7), the polycrystalline semiconductor film (4) being located on the insulator film (8) above the insulated semiconductor zone (7).

12 Claims, 7 Drawing Sheets

INTEGRATABLE CAPACITATIVE PRESSURE SENSOR

This application is a division of application Ser. No. 07/917,007, filed as PCT/DE91/CO107, Feb. 9, 1991, now U.S. Pat. No. 5,321,989.

The present invention relates to an integratable capacitative pressure sensor, particularly of the type which includes a semiconductor substrate and a polycrystalline semiconductor film, which define a pressure sensor cavity and which is provided with a dopant at least within a diaphragm-like area located above the pressure sensor cavity; a process for manufacturing such an integratable capacitative pressure sensor; and an integratable capacitative pressure sensor array.

A pressure sensor of the type in question as well as a process for its manufacture are already known from the following technical publications:

H. Guckel and D. W. Burns, "Planar Processed Polysilicon Sealed Cavities for Pressure Transducer Arrays" IEDM 1984, pages 223 to 225.

H. Guckel and D. W. Burns, "A Technology for Integrated Transducers" Transducers 185, Philadelphia 1985, pages 90 to 92.

Such a prior art pressure sensor is shown in FIG. 6. In the process for manufacturing this known pressure sensor, a silicon substrate 1 has first applied thereto a spacer film 2, which is also referred to as spacer. This spacer film 2 defines a future pressure sensor cavity 3. The spacer film 2 has deposited thereon a polysilicon film 4.

FIG. 7 shows a top view of the pressure sensor according to FIG. 6. As is clearly evident especially from FIG. 7, the spacer film 2 is provided with extensions extending through the polysilicon film 4 and defining etching passages 5 which permit the spacer film 2 to be removed from below the polysilicon film 4 by means of etching. When the spacer film 2 has been etched away, the etching passages 5 will be closed. Depending on the process executed, a vacuum or a gas pressure, which can be adjusted to a defined value, will remain in the pressure sensor cavity 3. The polysilicon film 4 has a diaphragm-like structure, which is adapted to be deformed by external pressure. The degree of deformation can be converted into an electrical signal by applied piezo-resistive resistors.

The deformation of the diaphragm, which consists of the polysilicon film 4, can also be detected capacitively, as is, for example, explained in the following technical publication:

M. M. Farooqui and A. G. R. Evans, "A Polysilicon-Diaphragm-Based Pressure Sensor Technology" Y. Phys. E. Sci. Inst. 20 (1987), pages 1469 to 1471.

For capacitively detecting the deformation of the diaphragm-like polysilicon film 4, the polysilicon film 4 can be doped heavily by implantation in the area of a diaphragm region 6, whereby a counterelectrode to the electrode formed by the substrate 1 is produced, as will especially be evident from FIG. 8.

Such a known pressure sensor is, however, not compatible with CMOS (complementary metal oxide semiconductor) circuits. Furthermore, the capacitance of the known pressure sensor depends on the voltage applied, since a non-ohmic resistance is created between the polysilicon film 4 and the silicon substrate 1. Furthermore, due to the resistance formed by the non-implanted region of the polysilicon film 4, the charge of the known pressure sensor has to be detected with a specific frequency. Hence, the known pressure sensor is not suitable for detecting pressure changes by means of low-frequency sampling read-out circuits. Nor can the known pressure sensor be used for monolithic integration with additional electronic circuit elements.

German Patent DE 37 23 561 A1 discloses a capacitative pressure sensor structure having a multi-layer, comparatively complicated structure. A lower insulating layer is formed on a substrate, the lower insulating layer having provided thereon a diaphragm support layer, which encloses a pressure sensor cavity. The diaphragm support layer is coated with a cover layer for closing the pressure sensor cavity. Only the diaphragm support layer, but not the cover layer, consists of a polycrystalline semiconductor material. A semiconductor zone, whose dimensions correspond essentially to those of the pressure sensor cavity located above the semiconductor zone, is defined within the substrate by a doping opposite to the doping of the substrate.

In the case of such a pressure sensor, the total capacitance of the sensor element is determined, on the one hand, by a pressure-dependent capacitance in the area of the diaphragm and, on the other hand, by a pressure-independent capacitance, which is essentially determined by the capacitance of the diaphragm supporting portion with respect to the substrate. Due to the small space between the diaphragm supporting portion and the substrate, the pressure-independent capacitance amounts to approximately 95 percent based upon the total capacitance value. In view of the fact that, in FIG. 1A of DE 37 23 561 A1, the diaphragm supporting portion is positioned above the non-doped area of the substrate, a dependence on the temperature and on the electric voltage of the pressure-independent capacitance component can only be reduced by insulating the conductive diaphragm portion from the polysilicon support layer by means of an upper insulation layer. If, in the case of this pressure sensor structure, the whole pressure sensor area which is located above the substrate and which determines the pressure sensor cavity were produced from one single material, the high, pressure-independent capacitance component would become excessively dependent on temperatures and voltages for the above-mentioned reasons.

It is the principal object of the present invention to provide a process for manufacturing a pressure sensor, as well as to provide a pressure sensor of the type mentioned above, in such a way that improved pressure sensor accuracy is achieved in combination with a simplification of the pressure sensor structure and a simplification of the manufacturing process.

In accordance with the present invention, it is possible to produce the part of the sensor body which encloses the pressure sensor cavity by precipitating one single polycrystalline semiconductor film, and this does not result in an excessively large temperature-dependent and voltage-dependent, pressure-independent capacitance component because the polycrystalline semiconductor film is located above the insulator film on the insulated semiconductor zone.

It is a further object of the present invention to provide an integratable pressure sensor array for measuring the pressure accurately.

In the following detailed description, preferred embodiments of the pressure sensor according to the invention as well as of pressure sensor arrays according to the invention will be explained in detail with reference to the accompanying drawings, in which:

FIG. 1A shows a cross-sectional view of a first embodiment of the pressure sensor according to the present invention;

In FIG. 1 to 5, reference numerals, which correspond to the reference numerals used in FIG. 6 to 8, refer to identical or to similar parts so that a renewed explanation of these parts can be dispensed with.

Figure 1A:
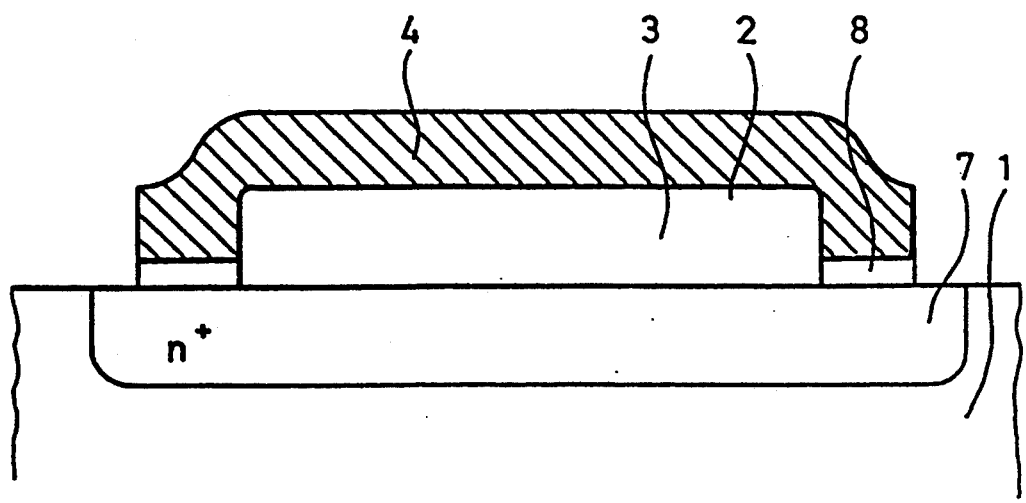
FIG. 1B shows a cross-sectional view of a second embodiment of the pressure sensor according to the present invention.
FIG. 1C shows a cross-sectional view of a third embodiment of the pressure sensor according to the present invention.

The process for producing the embodiment of the pressure sensor shown in FIG. 1A differs from the initially described manufacturing process according to the prior art with regard to the fact that, prior to the process step of applying the spacer film 2, the silicon substrate 1 is provided with a doping, which is chosen to be opposite to the conductivity type of the substrate, within a doping zone 7. It follows that, in the case of the p-substrate 1 shown, an n+-doped area 7 is generated, on the one hand for the purpose of producing a highly conductive electrode and, on the other hand, for the purpose of insulating this electrode, which is formed by the doped area 7, from the silicon substrate 1 by the pn-junction. Subsequently, an insulator film 8, which may consist e.g. of $Si_3N_4$, is applied to the doped area 7 thus formed. The spacer film 2 and the polysilicon film 4 are applied to the insulator film 8 in the manner described at the beginning, whereupon the guard film is removed by etching. The etching passages described at the beginning are then closed.

Figure 1B:
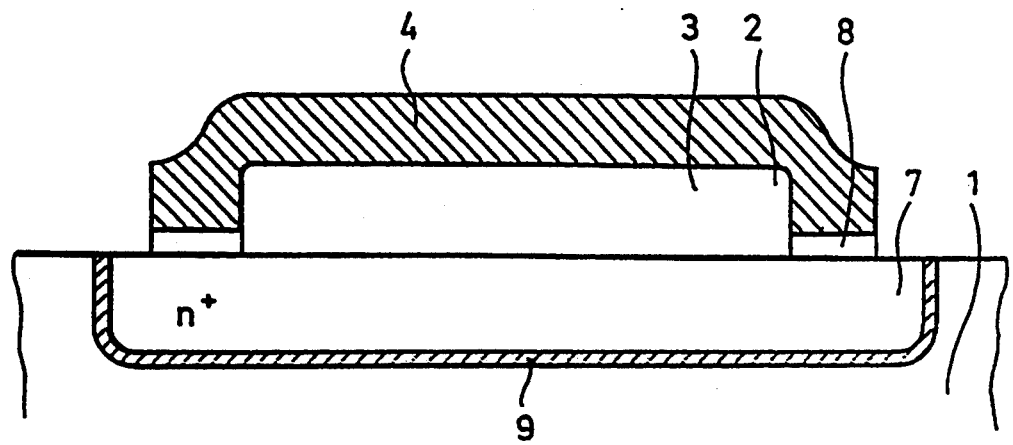

As can be seen in FIG. 1B, the step of producing a pn-junction for insulating the area 7 from the substrate 1 can also be replaced by the step of producing a buried insulation film 9, which will insulate the area 7, in the semiconductor substrate 1 by implantation of suitable implantation substances. The buried insulation layer 9 can consist of $SiO_2$ or of $Si_3N_4$. When the area 7 is insulated from the substrate 1 in this way, the area 7 will be annealed thermally after oxygen implantation.

Figure 1C:
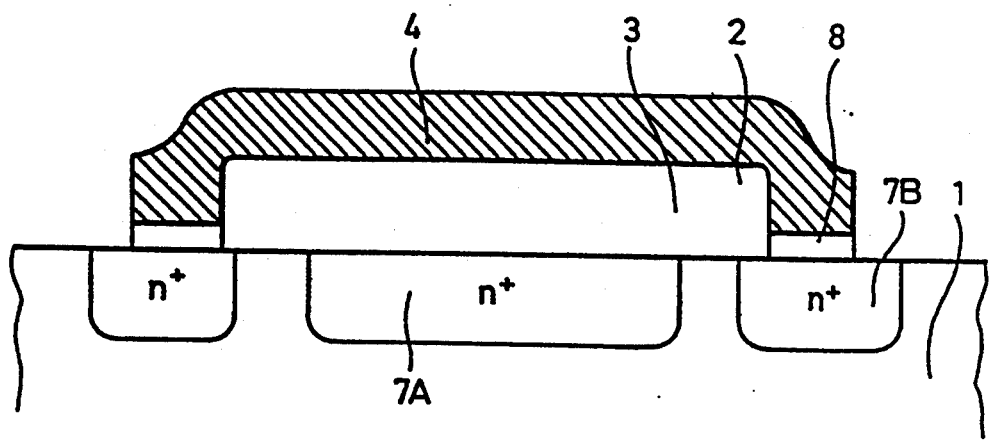

FIG. 1C shows a third embodiment of the invented pressure sensor, which differs from the embodiment according to FIG. 1A with regard to the fact that the doped area 7 is subdivided into a first doped area 7A, which forms an electrode of the pressure sensor capacitance, and in a second doped area 7B, which is arranged only below the supporting area of the polysilicon film 4. This structuring of the doped area 7 has the effect that the capacitance of the support no longer lies in the signal path so that the influences of this pressure-independent capacitance of the support can be reduced substantially.

In the invented pressure sensor, it is expedient to choose the doping of the doped area 7, 7B below the supporting area of the polycrystalline semiconductor film 4 so high that a metallic behavior in the range of degeneration will result therefrom; this reduces the influences of the temperature-dependent capacitance variation as well as of the voltage-dependent capacitance variation of the pressure-independent capacitance component of the sensor still further.

In any case, the invented pressure sensor structure constitutes a potential-free capacitor which is compatible with CMOS circuit elements and which permits integration within a CMOS circuit. The capacitance of the pressure sensor according to the invention depends only on the pressure, but not on the voltage applied. Due to the fact that the polysilicon film 4 is fully insulated from the silicon substrate 1, the capacitance of the pressure sensor can be detected in a quasi-static state as well as with high a high read-out frequency.

In the pressure sensor according to the present invention, the whole polysilicon film 4 can be provided with a dopant so as to increase its conductivity. A delimitation of the doped area, which is necessary in the case of the prior art, can be, but need not be effected in the case of the pressure sensor according to the present invention.

The useful capacitance of a single pressure sensor shown in FIG. 1A, 1B, 1C amounts, typically, to a few femtofarad. In the invented pressure sensor structure, it is, however, possible to arrange a plurality of such pressure sensors on a silicon substrate 1 in a field-like array.

Figure 2:
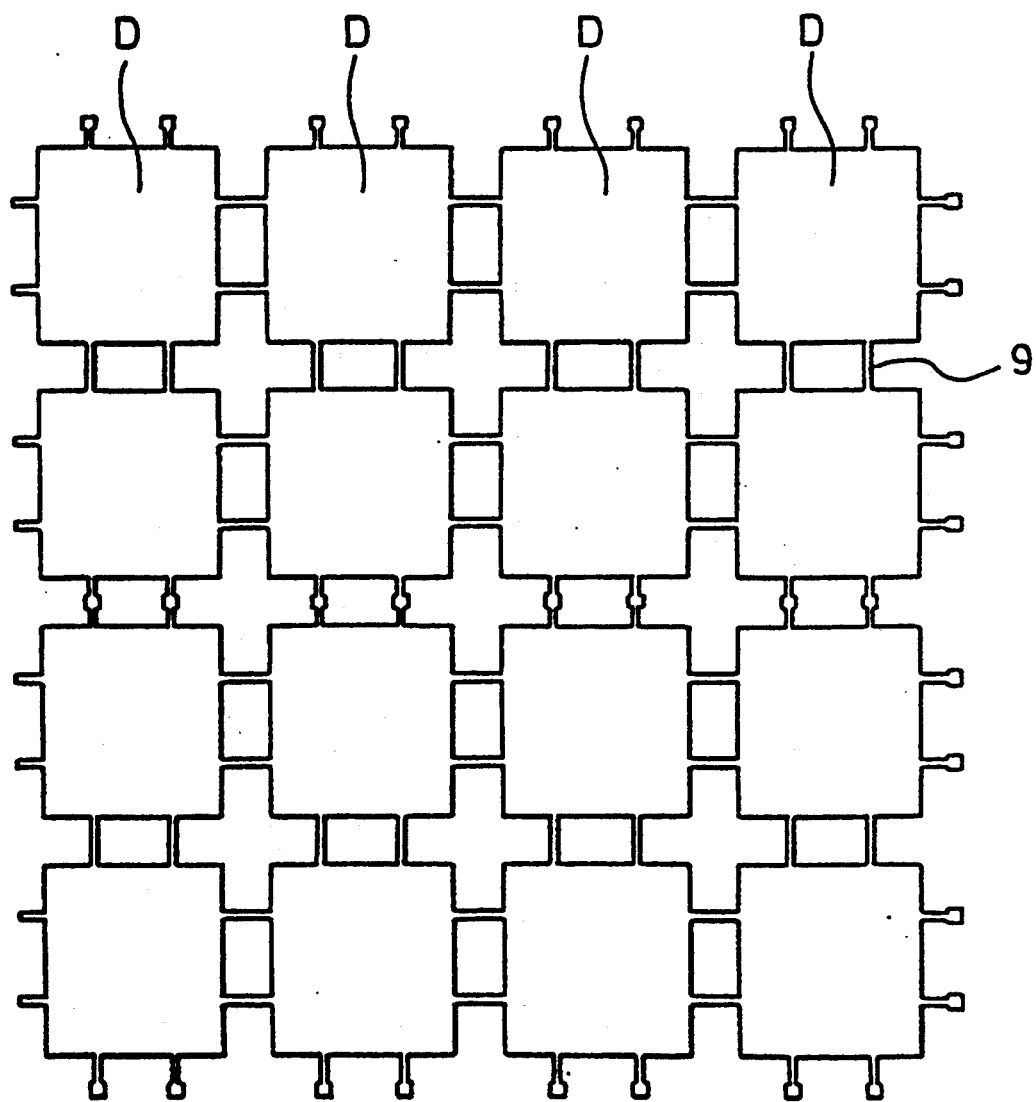
FIG. 2 shows a top view of an embodiment of a pressure sensor array according to the present invention.

As can be seen from FIG. 2, such pressure sensors D, which are arranged in a field-like array, can be interconnected by connection arms 9 of the polysilicon film 4 and can thus be connected in parallel for increasing the capacitance so as to obtain a higher output signal.

Depending on the type of interconnection used, it is also possible to detect the capacitance value of each individual pressure sensor D in the case of such a field-like array separately so as to measure pressure distributions in relation to the respective location or so as to construct a redundant pressure sensor system. Defective pressure sensors can then be detected so that these pressure sensors will no longer contribute to the total signal.

It is also possible that, in the case of such a field-like array, the diameters and/or the diaphragm thicknesses may vary from one pressure sensor to the next on one chip so that various pressure ranges can be detected with the sensors of a single chip.

The invented pressure sensor has a pressure-independent as well as a pressure-dependent capacitance component. The pressure-independent capacitance component consists e.g. of conductor capacitances as well as of the capacitance between the base of the polysilicon film 4 and the silicon substrate 1. Furthermore, the invented pressure sensor may be subjected to pressure-independent capacitance variations caused by the influence of temperature. The above-mentioned pressure-independent capacitance components or capacitance variations can be compensated in the case of a pressure sensor array, which is based on the invented pressure sensor and which includes a pressure sensor and a reference element.

Figure 3:
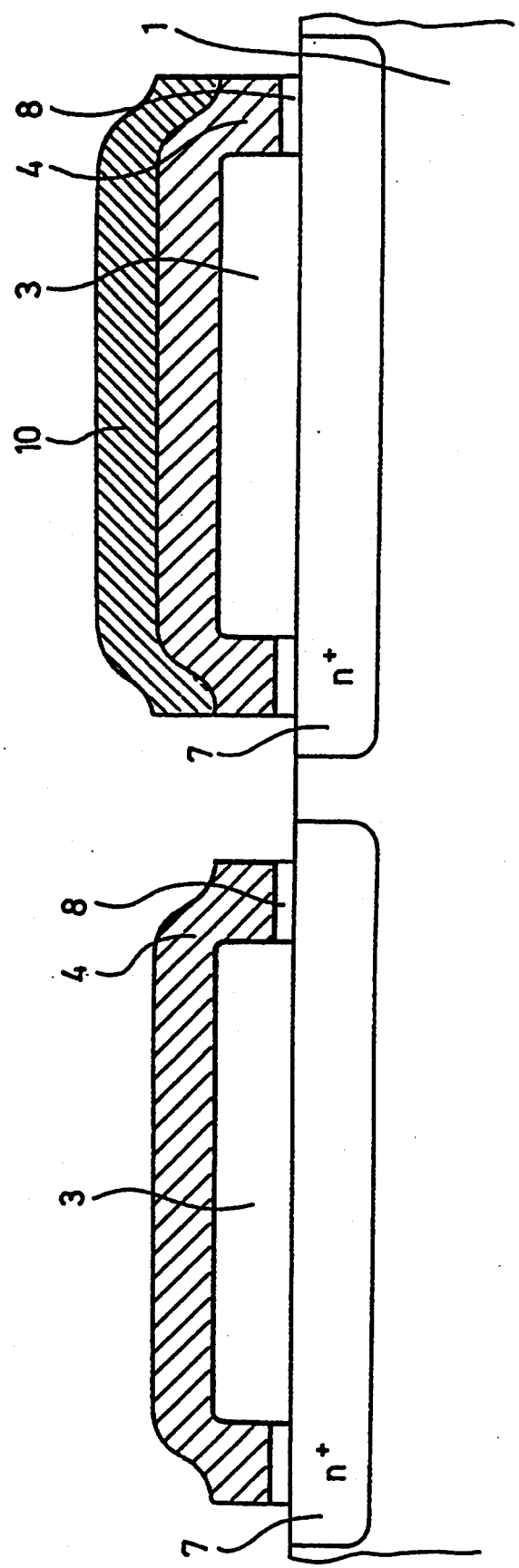
FIG. 3 shows a sectional view of an additional embodiment of a pressure sensor array according to the present invention.

FIG. 3 shows such an integratable, capacitative pressure sensor array including, on the left-hand side, a pressure sensor having the structure described hereinbefore and, on the right-hand side, a capacitative reference element. The only difference between the reference element according to the present invention and the pressure sensor according to the present invention is that the reference element has a polysilicon film 4 of increased flexural strength. In the embodiment shown, this increased flexural strength can be obtained by applying an additional film 10 to the polysilicon film 4 of the reference element 4. This can, for example, be done by precipitation of polysilicon. It is also possible to provide the reference element with a polysilicon film 4 whose thickness exceeds that of the pressure sensor.

A pressure sensor array including a pressure sensor and a reference element of the type shown in FIG. 3, permits a measurement of pressure by detecting the capacitance difference between the capacitance of the pressure sensor and that of the reference element. This has the effect that all capacitances and capacitance variations which are not pressure dependent will be compensated. In view of the fact that the pressure sensor and the reference element can be constructed on the same substrate 1 by the same manufacturing steps, the best possible similarity between the structure of the pressure sensor and that of the associated reference element will be obtained.

Figure 4:
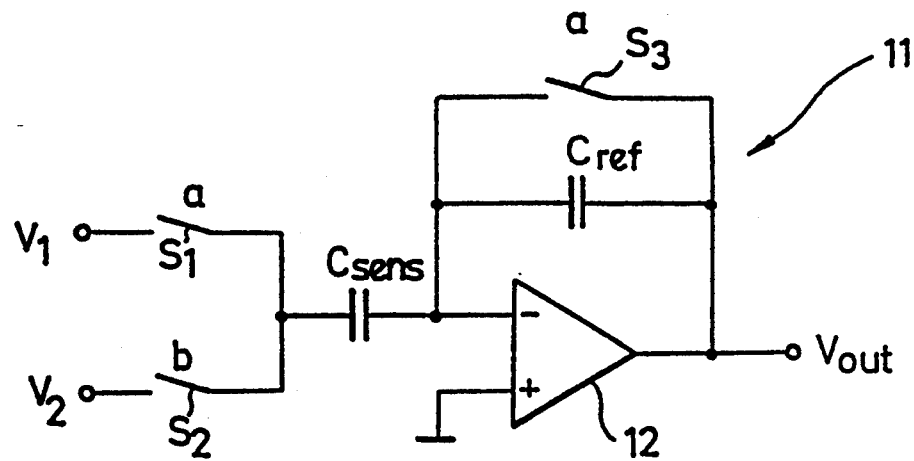
FIG. 4 and 5 show embodiments of the pressure sensor array according to the present invention in the form of circuits.
Figure 5:
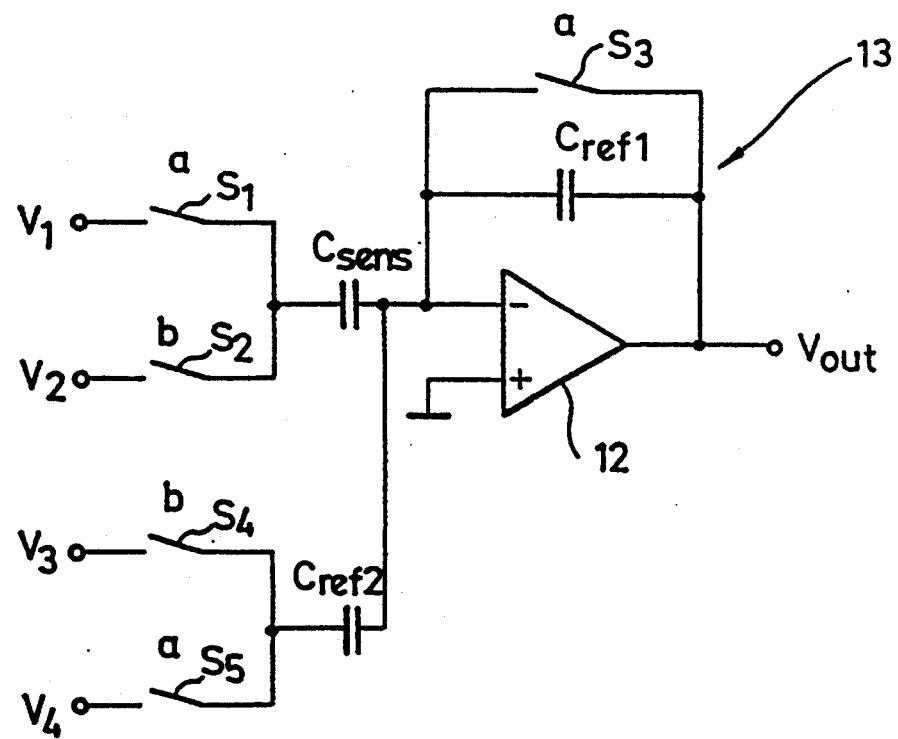
Figure 6:
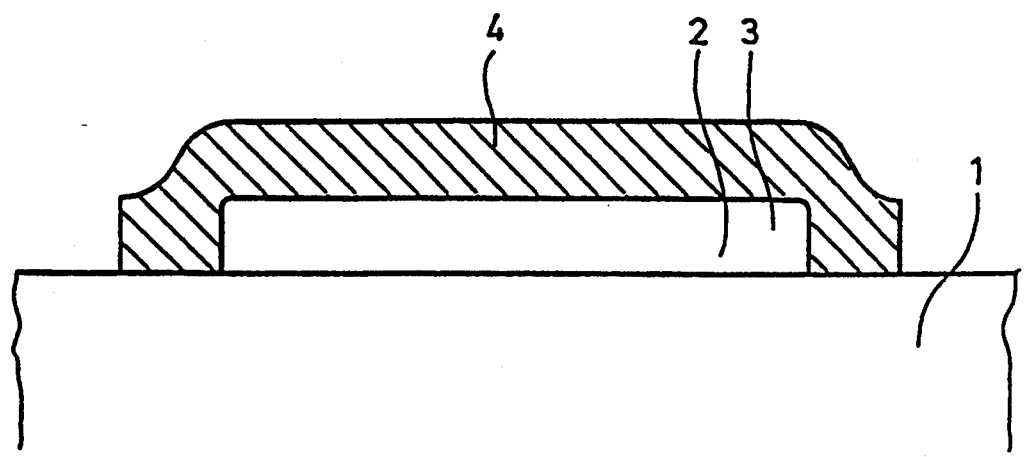
FIG. 6 shows a cross-sectional view through a known pressure sensor.
Figure 7:
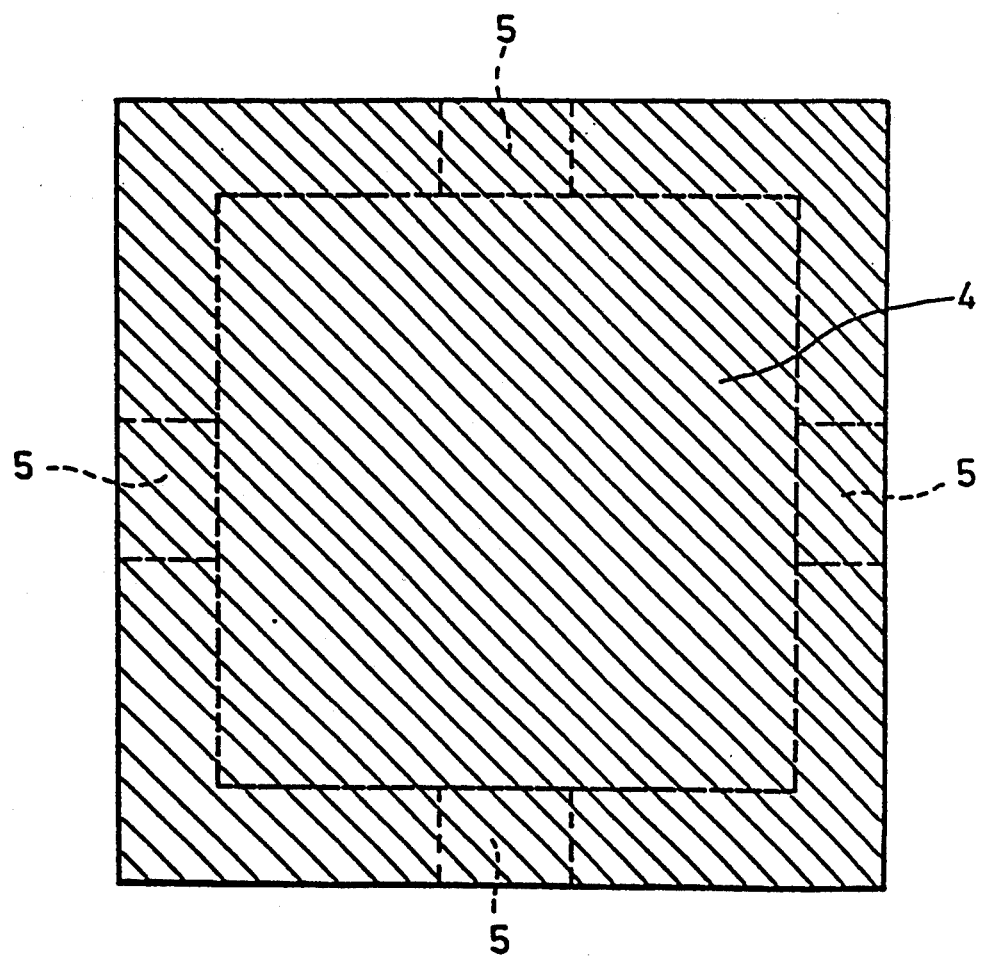
FIG. 7 shows a top view of the known pressure sensor shown in FIG. 1.
Figure 8:
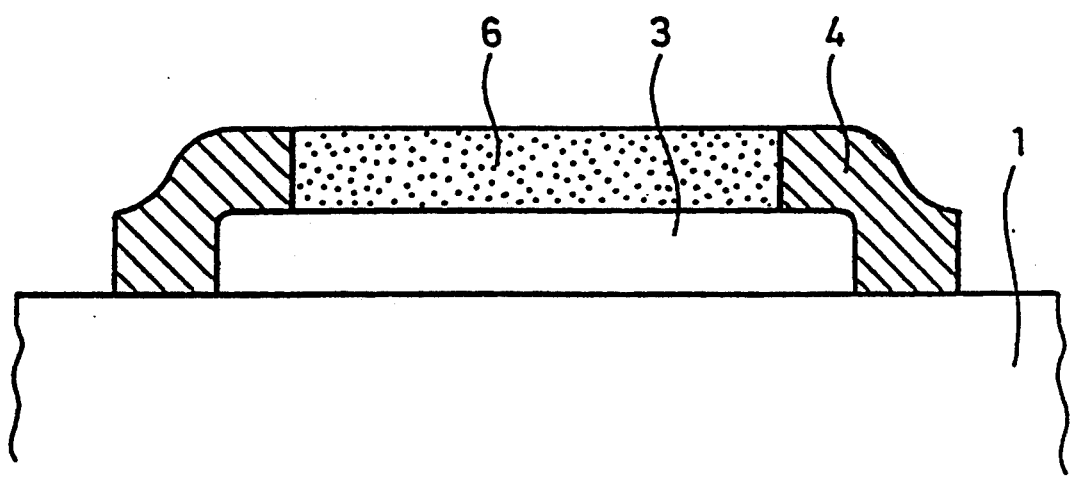
FIG. 8 shows a cross-sectional view of an additional, known pressure sensor.

The measurement of pressures by means of a pressure sensor/reference element pair can preferably be carried out in an expedient manner by so called capacitance measuring circuits of the switched capacitor type, which are shown in FIG. 4 and 5.

The capacitance measuring circuit of the switched capacitor type shown in FIG. 4 is provided with reference numeral 11 in its entirety and comprises an operational amplifier 12 whose non-inverting input is connected to ground. In a first control state a, the pressure sensor $C_{sens}$ has its first electrode connected to a first potential $V_1$ via a first switch $S_1$, and, in a second control state b, it has its first electrode connected to a second potential $V_2$ via a second switch $S_2$. The reference element $C_{ref}$ is positioned between the inverting input and the output of the operational amplifier, and a third switch $S_3$, which is closed in the first control state a and open in the second control state b, is connected in parallel with the reference element.

To the person skilled in the art, it will be evident that the output voltage $V_{out}$ of the capacitance measuring circuit of the switched capacitor type is proportional to the quotient of the capacitance of the pressure sensor $C_{sens}$ to that of the reference element $C_{ref}$.

Deviating from the embodiment of the capacitance measuring circuit of the switched capacitor type shown in FIG. 4, the pressure sensor $C_{sens}$ shown in FIG. 4 and the reference element $C_{ref}$ shown in the same figure can be changed round. Accordingly, a reciprocal dependence of the output voltage $V_{out}$ of circuit 11 will be obtained.

FIG. 5 shows a different embodiment of the capacitance measuring circuit of the switched capacitor type, which is here provided with reference numeral 13 in its entirety. Circuit components and control states corresponding to the embodiment of FIG. 4 are provided with the same reference numeral. Hence, the description following below can be restricted to an explanation of the features of circuit 13 which deviate from circuit 11 according to FIG. 4. In this embodiment, a second reference element $C_{ref2}$ has its second electrode connected to the inverting input of the operational amplifier 12. In a first control state a, the second reference element $C_{ref2}$ has applied to its first electrode a fourth potential $V_4$ via a fifth switch $S_5$, whereas, in a second control state b, it has applied thereto a third potential $V_3$ via a fourth switch $S_4$. The output voltage $V_{out}$ of this capacitance measuring circuit of the switched capacitor type 13 is proportional to the quotient of the capacitance of the pressure sensor $C_{sens}$ to that of the first reference element $C_{ref1}$ minus the quotient of the capacitance of the second reference element $C_{ref2}$ to that of the first reference element $C_{ref1}$. In such a circuit, additive capacitance terms will drop out so that the output voltage will depend only on the pressure to be measured.

What is claimed is:

1. An integratable capacitive pressure sensor comprising a semiconductor substrate and a polycrystalline semiconductor film having a generally central diaphragm area, which film defines together with said semiconductor substrate a pressure sensor cavity and which is provided with a dopant at least within said diaphragm area located above said pressure sensor cavity, wherein:

an insulator film is interposed between the polycrystalline semiconductor film and a semiconductor zone, which is located below said polycrystalline semiconductor film, the semiconductor zone is insulated from the semiconductor substrate, the polycrystalline semiconductor film defining the pressure sensor cavity is arranged on the insulator film above said insulated semiconductor zone such that the polycrystalline semiconductor film does not extend beyond the semiconductor zone in the lateral direction thereof.

2. A pressure sensor according to claim 1, wherein for producing a pn-junction, the semiconductor zone is doped opposite to the semiconductor substrate.

3. A pressure sensor according to claim 1, wherein a buried insulation film is positioned between the semiconductor zone and the semiconductor substrate.

4. A pressure sensor according to claim 1, wherein the semiconductor substrate includes silicon, the polycrystalline semiconductor film includes polysilicon and that the insulator film includes $Si_3N_4$.

5. An integratable capacitive pressure sensor array including a capacitative pressure sensor according to claim 1, comprising a capacitative reference element whose structure corresponds to that of the capacitative pressure sensor with the exception of a higher flexural strength of the polycrystalline semiconductor film spanning the reference element cavity.

6. A pressure sensor array according to claim 5, wherein the thickness of the polycrystalline semiconductor film of the reference element exceeds the thickness of the polycrystalline semiconductor film of the capacitative pressure sensor.

7. A pressure sensor array according to claim 5, wherein the polycrystalline semiconductor film of the reference element is reinforced by an additional film increase its flexural strength.

8. A pressure sensor array according to claim 5, further comprising a plurality of pressure sensor/reference element pairs arranged on a common semiconductor substrate in a field-like array.

9. A pressure sensor array according to claim 5, further comprising a capacitance measuring circuit of the switched capacitor type comprising the pressure sensor and the reference element.

10. A pressure sensor array according to claim 9, further comprising said pressure sensor being provided with at least two electrodes, wherein:

a first electrode of the pressure sensor is adapted to be acted upon by a first potential ($V_1$) in a first control state (a) of the capacitance measuring circuit of the switched capacitor type and by a second potential ($V_2$) in a second control state (b), a second electrode of the pressure sensor is connected to the inverting input (−) of an operational amplifier of the capacitance measuring circuit of the switched capacitor type, the reference element is positioned between the inverting input of the operational amplifier and the output thereof and is discharged in the case of one of the two control states (a, b), and the non-inverting input (+) of the operational amplifier has applied thereto a reference potential (ground).

11. A pressure sensor array according to claim 9, further comprising said reference element being provided with at least two electrodes, wherein:

a first electrode of the reference element is acted upon by a first potential ($V_1$) in a first control state (a) of the capacitance measuring circuit of the switched capacitor type and by a second potential ($V_2$) in a second control state (b), a second electrode of the reference element is connected to the inverting input (−) of an operational amplifier of the capacitance measuring circuit of the switched capacitor type;

the pressure sensor is positioned between said inverting input (−) of the operational amplifier and the output thereof and is discharged in the case of one of the two control states (a,b): and the non-inverting input (+) of the operational amplifier has applied thereto a reference potential (ground).

12. A pressure sensor array according to claim 9, further comprising said pressure sensor and said said reference element each being provided with at least two electrodes, wherein:

a first electrode of the pressure sensor is acted upon by a first potential ($V_1$) in a first control state (a) of the capacitance measuring circuit of the switched capacitor type and by a second potential ($V_2$) in a second control state (b);

a first electrode of the reference element is acted upon by a fourth potential ($V_4$) in a first control state (a) of the capacitance measuring circuit of the switched capacitor type and by a third potential ($V_3$) in a second control state (b);

the respective second electrodes of the pressure sensor and of the reference element are connected to the non-inverting input (−) of an operational amplifier;

an additional capacitative reference element is positioned between the inverting input (−) of the operational amplifier and the output thereof; and the non-inverting input (+) of the operational amplifier has applied thereto a reference potential (ground).

* * * * *